W. A. FIELD.
ADJUSTABLE HANDLE.
APPLICATION FILED MAR. 11 1922.
1,429,940. Patented Sept. 26, 1922.
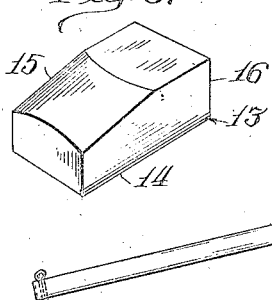
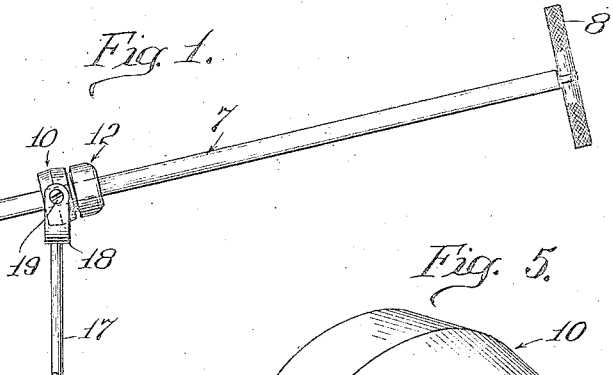
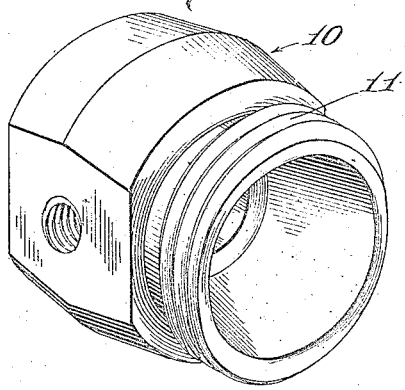
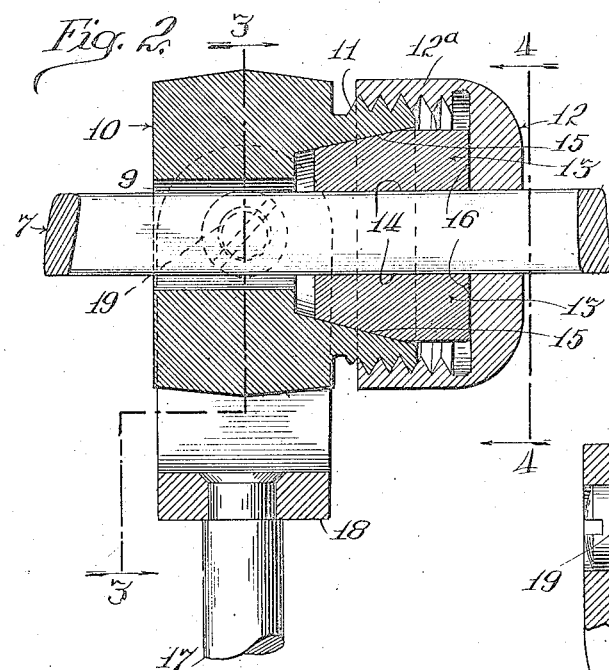
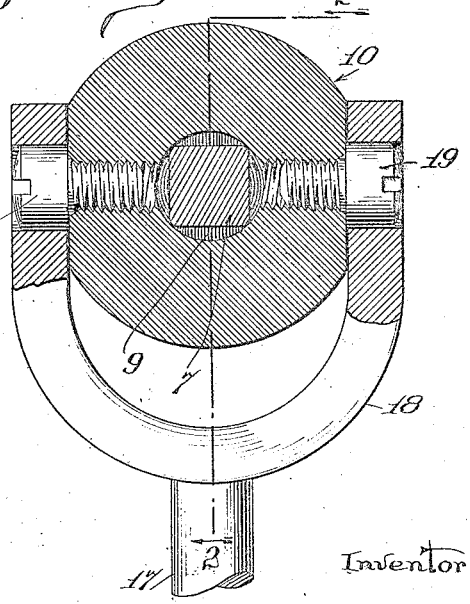
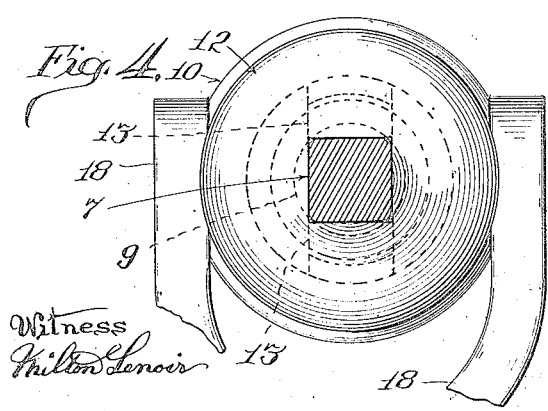
Inventor
William A. Field,
Adams & Jackson
Attorneys
Witness
Milton Lenoir Patented Sept. 26, 1922.

1,429,940

UNITED STATES PATENT OFFICE.

WILLIAM A. FIELD, OF CHICAGO, ILLINOIS.

ADJUSTABLE HANDLE.

Application filed March 11, 1922. Serial No. 543,129.

*To all whom it may concern:*

Be it known that I, WILLIAM A. FIELD, a citizen of the United States, and a resident of Chicago, in the county of Cook and State of Illinois, have invented certain new and useful Improvements in Adjustable Handles, of which the following is a specification, reference being had to the accompanying drawing.

My invention relates to handles used in connection with various types of machines, such as routing machines, where it is desirable that the length of the handle may be varied, and has for its object to provide an improved handle the operating length of which may be very quickly and easily adjusted without the use of tools. I accomplish this object as illustrated in the accompanying drawings and hereinafter described.

What I regard as new is set forth in the claims

In the accompanying drawings,—

Fig. 1 is a plan view of my improved handle;

Fig. 2 is an enlarged detail, being partial longitudinal sectional view on line 2—2 of Fig. 3;

Fig. 3 is a cross-section on line 3—3 of Fig. 2;

Fig. 4 is a cross-section on line 4—4 of Fig. 2;

Fig. 5 is a perspective view of the head through which the handle operates; and

Fig. 6 is a perspective view of one of the wedge blocks by which the handle rod or shaft is clamped against endwise movement with relation to the head.

My improved handle comprises a rod or shaft 7 which, as shown in Figs. 3 and 4, is non-circular, preferably square, in cross-section, and is provided at one end with a gripping device 8, preferably in the form of a cross-bar, by which it may be moved endwise or rotated. The rod 7 extends freely through a passage 9 in the head or block 10, so that it is capable of being moved endwise through said head and of being rotated independently thereof. The head 10 is provided at one side with an externally screw-threaded sleeve 11, the inner face of which is tapered to form a conical bearing surface concentric with the axis of the passage 9. Mounted upon the rod 7 is a cap sleeve 12 which is provided with a central opening to receive the rod 7. This opening is squared or otherwise shaped to conform to the cross-sectional contour of the rod 7, so that said cap sleeve rotates with said rod, but the rod is free to move endwise therethrough. The sleeve portion 12ª of said cap sleeve is internally threaded to screw upon the threads of the sleeve 11, and consequently by rotating the rod 7 the cap sleeve 12 may be screwed upon or unscrewed from said sleeve 11.

Fitted between the cap sleeve 12 and the inner conical surface of the sleeve 11 are a series of wedge blocks 13, the shape of which is best shown in Figs. 2 and 6, from which it will be seen that they have a plane surface 14 adapted to bear on one of the surfaces of the rod 7, and an inclined surface 15 adapted to fit against the inclined surface of the sleeve 11. The larger end 16 of the wedge block is adapted to bear against the inner perpendicular face of the cap sleeve 12, as shown in Fig. 2.

It will be evident from the foregoing description that by rotating the rod 7 in the appropriate direction to screw the cap sleeve 12 upon the sleeve 11 the wedge blocks 13 may be forced into wedging engagement with the sleeve 11 and rod 7, thereby tightly clamping said rod against endwise movement with respect to the head 10, and that by rotating said cap sleeve in the opposite direction the rod 7 may be released to permit it to move freely longitudinally through the head 10. By a simple turn of the wrist, therefore, the operator can release the rod 7 and adjust it so that the cross-bar 8 is at the desired distance from the head 10, and then by twisting the handle in the opposite direction he can clamp it in its adjusted position. The head 10 in the construction shown serves as a means of connecting the handle to the part to be operated by it, which in this case is shown as being a rod 17 having a yoke 18 in which the head 10 is supported by trunnions 19 in the form of screws the heads of which are fitted in the yoke while the screws are screwed into opposite sides of the head in line with the axis thereof. The rod 17 is connected with the part to be operated by the handle, or if the handle is used as a lever, may either be connected with the load or form the fulcrum for the lever.

My improved handle may be used for a great variety of purposes, for example, as a transom lifter, and I wish it to be understood, therefore, that the improved construction shown and described is claimed for any use to which it is adapted. While I prefer to use two clamping blocks it will be evident that any desired number of such blocks may be provided.

What I claim as my invention and desire to secure by Letters Patent, is—

1. A handle comprising a head having a passage therethrough and an inclined bearing surface, a rod extended through said head, a wedge block adapted to bear against said rod and said inclined bearing surface, and means movable longitudinally on said rod and operated by the rotation thereof for clamping said wedge block between said bearing surface and said rod.

2. An adjustable handle comprising a head having a passage therethrough and a sleeve concentric with said passage, a rod movable longitudinally through said passage, a cap sleeve movable longitudinally of said rod and rotating therewith, said cap sleeve being adapted to screw upon said first-mentioned sleeve, and clamping means between said first-mentioned sleeve and said rod and actuated by the rotation of said cap sleeve for clamping said rod against longitudinal movement with reference to said head.

3. A handle comprising a head, a rod movable through said head and adapted to rotate independently thereof, a cap sleeve slidably mounted on said rod and rotating therewith, said cap sleeve being adapted to screw upon said head, and clamping means operated by the screwing of said cap sleeve on said head for clamping said rod against endwise movement with relation to said head.

4. A handle comprising a head, a rod movable through said head and adapted to rotate independently thereof, a cap sleeve slidably mounted on said rod and rotating therewith, said cap sleeve being adapted to screw upon said head, and wedge blocks between said head and said rod and actuated by the screwing of said cap sleeve upon said head for clamping said rod against endwise movement with relation to said head.

5. An adjustable handle comprising a head having a laterally-projecting externally screw-threaded sleeve provided with a conical inner surface, a rod fitted to move longitudinally through and to rotate in said head, wedge blocks between said conical surface and said rod, and a cap sleeve slidably mounted on said rod and rotating therewith, said cap sleeve being adapted to screw upon said screw-threaded sleeve to actuate said wedge blocks.

6. A handle comprising a head, a rod movable longitudinally through said head and adapted to rotate independently thereof, clamping means for clamping said rod against longitudinal movement through said head, and means movable longitudinally on said rod and rotating therewith for actuating said clamping means.

7. A handle comprising a head, a rod movable longitudinally through said head and adapted to rotate independently thereof, clamping means for clamping said rod against longitudinal movement through said head, and a member cooperating with said head and actuated by the rotation of said rod for operating said clamping means.

8. A handle comprising a head, a rod movable longitudinally through said head and adapted to rotate independently thereof, clamping means for clamping said rod against longitudinal movement through said head, and a rotatable member cooperating with said head and actuated by the rotation of said rod for operating said clamping means.

WILLIAM A. FIELD.